United States Patent [19]

Richards

[11] 4,042,788
[45] Aug. 16, 1977

[54] TONE DETECTOR
[75] Inventor: Glenn L. Richards, Rochester, N.Y.
[73] Assignee: Stromberg-Carlson Corporation, Rochester, N.Y.
[21] Appl. No.: 686,774
[22] Filed: May 17, 1976
[51] Int. Cl.² .................................... H04M 1/50
[52] U.S. Cl. ..................................... 179/84 VF
[58] Field of Search ............... 179/84 VF; 324/78 D; 328/138, 139, 140

[56] References Cited
U.S. PATENT DOCUMENTS

3,790,720  2/1974  Schartmann ............... 179/84 VF

Primary Examiner—Kathleen H. Claffy
Assistant Examiner—Joseph A. Popek
Attorney, Agent, or Firm—William F. Porter, Jr.; Michael F. Oglo

[57] ABSTRACT

A digital tone detector is of the period detection type employing a digital counter which is stepped by means of a high speed clock. The counter is reset by zero-crossings of an analog tone signal. A set of period range decoder gates indicate the presence of any of a set of predetermined frequency tones. A ÷ 4 counter is introduced between the terminal which receives the zero-crossing signal and the reset input of the counter. Sequence control circuits are provided to coordinate the timed relationship of readout and initiation of a new detection period such that the speed of response is minimally degraded by the ÷ 4 counter.

8 Claims, 10 Drawing Figures

FIG. 7

TONE DETECTOR

CROSS-REFERENCES TO RELATED APPLICATIONS

This application does not claim an invention disclosed in a prior filed copending application of the same applicant.

However, the following identified copending applications are related to the present application in that subject matter, disclosed but unclaimed herein, is disclosed and claimed in them. The present application and these related applications were all concurrently filed. These related copending applications are: Ser. No. 686,733, filed May 17, 1976, entitled "Tone Combination Detector and Coincidence Timer Apparatus"; Ser. No. 686,772, filed May 17, 1976, entitled "Output Processing and Output Coupling Circuit for a Digital Tone Receiver"; and Ser. No. 686,771, filed May 17, 1976, entitled "Voice Guard Circuit for a Tone Receiver".

BACKGROUND OF THE INVENTION

1. Field of the Invention

This invention relates to a tone detector circuit of the type employing the period detection technique, and more particularly to such a circuit which is of special utility for tone receivers used in telecommunications.

2. Description of the Prior Art

A tone receiver is an electronic device used in telecommunications systems to convert a Dual Tone Multiple Frequency (DTMF) signal into a multiple digit binary code. The format of a DTMF signal consists of high and low tones signal bands (697–941 Hz., and 1209–1633 Hz.). Each band carries a selected one tone of a predetermined set of four tone signals unique to the respective band. That is, there is simultaneous presence of two tones, with one in each band and with each such one tone in each band being a selected one of four possible tones for the band. The DTMF signal system is sometimes referred to as a "2-of-8" signal system.

A tone detector is a device for detecting which of the pedetermined set of tones in one of these bands is present. Tone detectors of the period detection type measure the interval between zero-crossings of the analog input signal in the band as a multiple of a crystal-controlled clock signal. The detection of a tone is provided by a set of period range decoder gates which detect period counter output states spanning ranges of frequencies about the precise frequencies of the set of tones in the band.

Typically, axis crossing signals are detected by a Schmidt-Trigger circuit.

The choice of detection bandwidths (i.e. the range of period counter output states detected by the period range decoder gates) is a compromise. Narrowing detection bandwidth increases the detector's capability to reject tones deviating from the precise frequencies of valid tones. Widening the detection bandwidth increases toleration of distortion of a valid tone by such causes as cross modulation from the other band, white noise, spikes, dial tone, and power line pickups. The quality of rejection of tones deviating from the precise frequencies of a valid tone is sometimes referred to as the "Voice Guard" quality of the detector. The reason for this use of the term is that a common source of invalid tones is the inadvertent simulation of a valid tone by a voice signal.

Prior to the present invention the above described compromise in detection bandwidth has been effected by choosing detection bandwidths which were relatively large and resulted in undesired degradation of the voice guard quality of a tones detector. More specifically, the detection bandwidths of the frequency range detector gates had to be sufficiently large to reliably operate under conditions of "jitter" in the zero-crossings signal from the Schmidt-Trigger axis-crossing detector circuit. These conditions of jitter sometimes occurred as a result of noise and amplitude variations caused by the sources mentioned in the preceding paragraph.

It is also important that a tone detector operate without any unnecessary delay in processing a tone burst. Under U.S. telecommunications practices a DTMF signal burst must be rejected if less than 20 milliseconds in duration and must be detected if more than 40 milliseconds in duration. On the other hand, in the lower frequency band of a DTMF signal system a failure to properly process one period of a received tone can cause a delay amounting to the better part of 5 milliseconds. The problem of quick response in processing a signal is particularly difficult if a tone burst is preceded by a nonvalid tone conditions.

Accordingly, among the objects of the present invention are the provision of:

1. A tone detector having smaller detection bandwidths than heretofor possible with prior art apparatuses.

2. A tone detector having improved voice guard qualities.

3. A tone detector in accordance with the preceding objective which achieves the improved voice guard quality with minimal degradation of speed of response.

4. A tone detector capable of operting in the presence of conditions of jitter of zero-crossings signals, without significant degradation of detection quality.

5. A tone detector which retains improved performance over a wider signal dynamic range.

SUMMARY OF THE INVENTION

The detector of the present invention is of the type employing the period detection technique. A period counter measures the interval between input signal "zero-crossings" as a multiple of a crystal-controlled clock signal. Period range decoders detect counter output states that correspond to frequency spanes of interest. Each span of interest is about ±2.5% relative to the precise frequency of the tone to be detected. A Schmidt-Trigger circuit detects the zero-crossings. However zero-crossings have been found to sometimes contain a substantial amount of time jitter due to such things as interference from the other band, dial tone, and noise. This jitter is noncumulative over several signal cycles. A ÷ 4 counter is introduced between the zero-crossing detector and the period counter. By dividing the signal frequency by a factor of four, the jitter is reduced by a factor of four as a ratio of time jitter to signal period. This make it unnecessary to provide excessively wide detection bandwidths to allow for the noise-induced jitter.

Since the period counter is stepped by an external clock while the ÷ 4 counter is stepped by the tone signal, means is needed to insure that no tone signal edge detection is lost as a result of the triggering edge occurring coincident with the clock pulse. A first flip-flop stage of a digital sync generator (or sequence control circuit) is triggered by the falling edge of the ÷ 4 counter (which in turn is triggered by a falling edge of the zero crossings detector output). The SET state of the first flip-flop stage is shifted into a second flip-flop stage of the sync generator by the clock, which in turn resets the first stage. The next clock pulse resets the second flip-flop stage, but sets a third flip-flop stage of the sync generator. As the second stage is being reset, the states of the period range decoder gates are loaded into latching flip-flops. (These latching flip-flops may hereinafter and in the claims sometimes be referred to as "frequency latches".)

Ideally, at the same time the latching flip-flops are updated the period counter should be cleared to zero. Instead, one clock cycle later, as the third flip-flop stage of the sync generator is about to be reset, the sync generator enables a clock pulse to preset the period counter to a first state. The period counter output count condition ends up as though the period counter had been cleared to zero at the proper time.

If the period counter reaches an output count condition beyond the highest code detected by the period decoders, the first stage of the period counter is blocked, preventing further advancement of the counter. This insures that the counter will not recycle during idle periods. This end-of-count (EOC) condition is used to reset the latching flip-flops to avoid false outputs between tone bursts. The EOC is selected to be as close as practical to the valid code range.

At a count state just before the lockup code, the ÷ 4 counter is preset to its 1-1 state. This allows the period counter to be started into a new count cycle on the very first following Schmidt-Trigger cycle to avoid unnecessary delay at the beginning of a tone burst.

DESCRIPTION OF THE PREFERRED EMBODIMENT

A. Overview

Figures 1A, 1B:
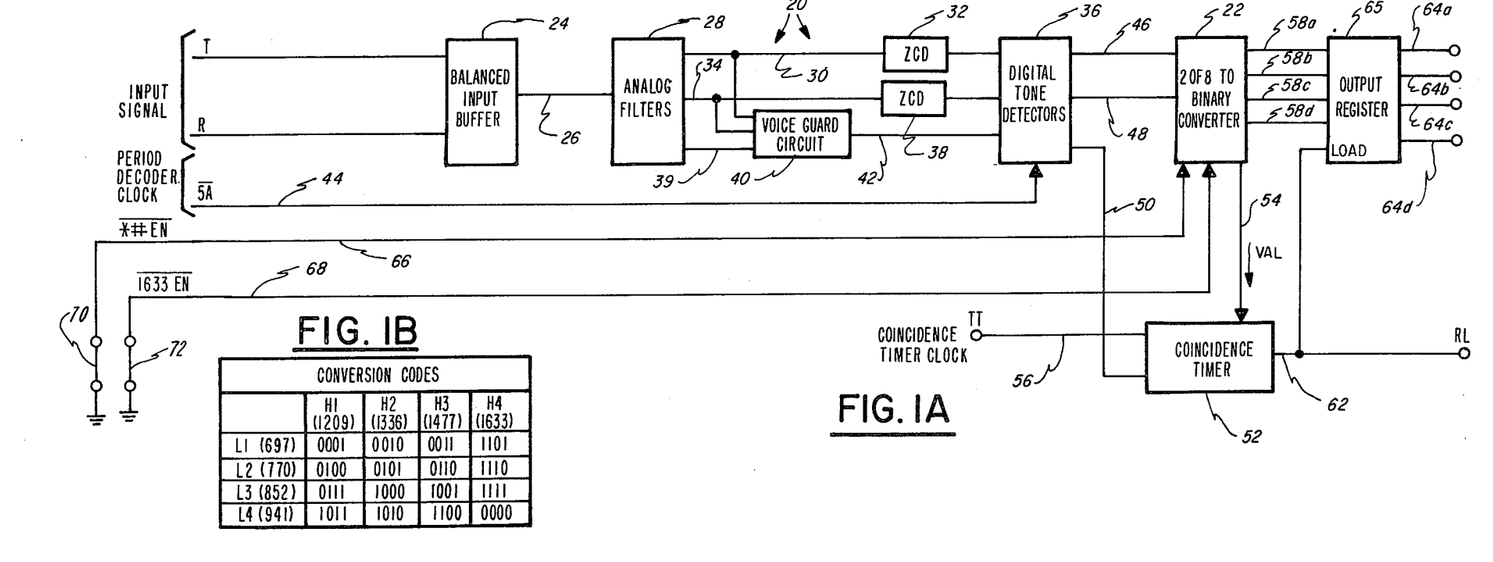
FIG. 1A is a tone receiver which employs a tone detector in accordance with the present invention.
FIG. 1B is a chart showing the conversion of DTMF signals to binary code performed by the tone receiver of FIG. 1A.

Referring now to the drawing, and in particular to FIG. 1A, a tone receiver 20 which employs the present invention is shown. Its function is to convert the Dual Tone Multiple Frequency (DTMF) or "2-out-of-8", tone codes into a four digit binary code. The DTMF code is employed in telephone systems for tone signal type dial pulsing, and other purposes. Tone receiver 20 has input terminals T and R at which the tone code signal are received in a form of a balance differential signal. A 2-out-of-8 code signal consists of the simultaneous presence of a tone of a pedetermined set of four lower frequency band (or channel) tones and another tone of any of a pedetermined set of four upper frequency band (or channel) tones.

FIG. 1B is a chart of the conversion codes corresponding to the combinations of the low band signals and the high band signals. The low band signals are L1, L2, L3, and L4, and the high band signals are H1, H2, H3, and H4. For example, L1 frequency, namely 697 Hertz, in combination with H1 frequency, namely 1209 Hertz, produces at the output of receiver 20 a binary code of 0001, which represents a decimal digit of one. The other frequencies in the low band, namely 770, 852 and 941 Hertz and the other frequencies in the high band, namely 1336, 1477, and 1633 Hertz, are also used in the formation of combinations. The implementation of the conversion from tones to digital outputs are implemented in the 2-of-8 binary converter 22 which will be described later.

A conventional balanced input buffer amplifier 24 receives the tone combination and converts the differential signal to a single-ended signal. It also aids in the rejection of common mode signals and tends to attenuate low frequency differential signals that might otherwise interfere with the dynamic range of the analog filters which follow. A preferred construction of buffer amplifier is disclosed in a commonly assigned, copending patent application of Glenn L. Richards entitled "Difference Amplifier Having Extended Common Mode Range", Ser. No. 673,827, filed Apr. 5, 1976.

A lead 26 couples the output from the balanced input buffer to a bank of analog filters 28 which separates a high band signal component of the input signal from a low band signal component of the input signal. The bank of filters 28 also isolates a signal component of the input signal from the portion of the frequency spectrum above the high band. Lead 30 out of filters 28 communicates the low band to a zero-crossing detector 32, which in turn is connected to digital tone detectors 36. The high band signal, from the analog filters on a lead 34, is communicated to a zero-crossing detector 38. The output of detector 38 is also connected to the digital tone detectors 36. The analog filters 28 select the low band and the high band and reject frequencies outside those frequency ranges. In particular the low band filter rejects dial tone and high band tones by a least 30db, and the high band filter rejects low band tones by at least 30db. The third output from the analog filters, a lead 39, communicates frequencies above the high band into a voice guard circuit 40. As shown on the diagram, leads 30 and 34 ae also inputs to the voice guard circuit 40. The output of the voice guard circuit also goes into the digital tone detectors 36 via a lead 42. Voice guard circuit 40 contains analog signal processing circuits which culminate in the formation of a digital output signal. The output of voice guard circuit 40 serves to improve the confidence level of the correctness of the tone combinations presented from zero-crossing detectors 32 and 38.

The digital tone detectors 36 detect the tones of the two band signals by a digital process in conjunction with a clock input signal $\overline{5A}$ received on a lead 44. The two main outputs from the digital tone detectors, on leads 46 and 48, present an indication of detection of the low channel and high channel tones. These are presented to the 2-of-8 to binary converter 22 for conversion to the four bit binary output format. Outputs 50 from the digital tone detectors 36 indicate a coincidence of the two detected frequencies for application to a coincidence timer 52. A lead 54 from converter 22 presents to the coincidence timer 52 an enable signal as long as a combination of tones that have been determined to be those representing valid combinations remains detected in converter 22. This enables the indication presented from outputs 50 to actuate the coincidence timer to do its timing to determine if the duration of the tone presence is long enough to represent a valid detection.

The coincidence timer 52 operates by a counting principle employing a clock signal TT received on lead 56. The frequency of the clock signal TT is a lower frequency than that of the clock signal $\overline{5A}$. However, in general they are independent and could be the same frequency depending on the design of the coincidence timer. In one exemplary embodiment of a tone receiver 20, clock signal $\overline{5A}$ is a negative pulse of one quarter microsecond duration occurring every three microseconds, and clock signal TT is a 24 microsecond pulse occuring every 1632 microseconds. The output signal RL delivered from the coincidence timer via a lead 62, indicates to the utilization circuits (not shown) that a valid tone has been detected. On the leading edge of this signal the output register 65 is loaded from the output of the 2-of-8 to binary converter on leads 58a, 58b, 58c and 58d. Then the output of the output register as presented to the utilization circuits is available at the end of the pulse RL presented on lead 62. The outputs from output register 65 are designated 64a, 64b, 64c and 64d.

As may be seen by reference to FIG. 1B, there are 16 possible combinations of the low and high band signals, and therefore 2-of-8 to binary converter 22 may persent to the output register 65 up to 16 different digital codes. If it is desired that certain subsets of these codes not be detected, they can be inhibited by leaving HIGH the leads labeled 66 and/or 68. For example, by jumpering to ground lead 66 by means of a removable conductive link 70, the asterisk (*) and octothorp (#) codes (L4, H1; and L4, H3) are enabled. By removing conductive link 70, they are inhibited. Similarly, by grounding lead 68 by removable conductive link 72 the four combinations employing 1633 Hertz band codes (L1, H4; L2, H4; L3, H4; L4, H4) can be enabled. By removing link 72 they are inhibited. The significance of these "enables" is as follows. The 2-of-8 to binary converter 22 will present on its output lead 54 an indication that only those tone combinations which are enabled are valid signals. Presence of an inhibited tone combination may be detected, and therefore cause a detection signal along outputs 50 of digital tones detectors 48. However, for an inhibited tone the coincidence timer 52 will not be enabled due to the lack of an enable on lead 54. In turn, the coincidence timer will not produce an output signal RL to load the output registers or indicate a valid signal condition to the utilization circuits.

The output signal RL of the coincidence timer on lead 62 is necessary not only to load the output register each time a new digit is received, but, it also constitutes an auxiliary output signal to the utilization circuits that this new digit has been received. For example, if two successive digits of the same value had been received the output register would continue to have the same code throughout the duration. Without the lead RL to enable utilization circuits to recognize that a second digit of the same value had been received, the utilization circuits would not be able to recognize that two distinct digits had been received.

B. Analog Signal Processing and Zero-Crossing Detectors

Figures 2, 3:
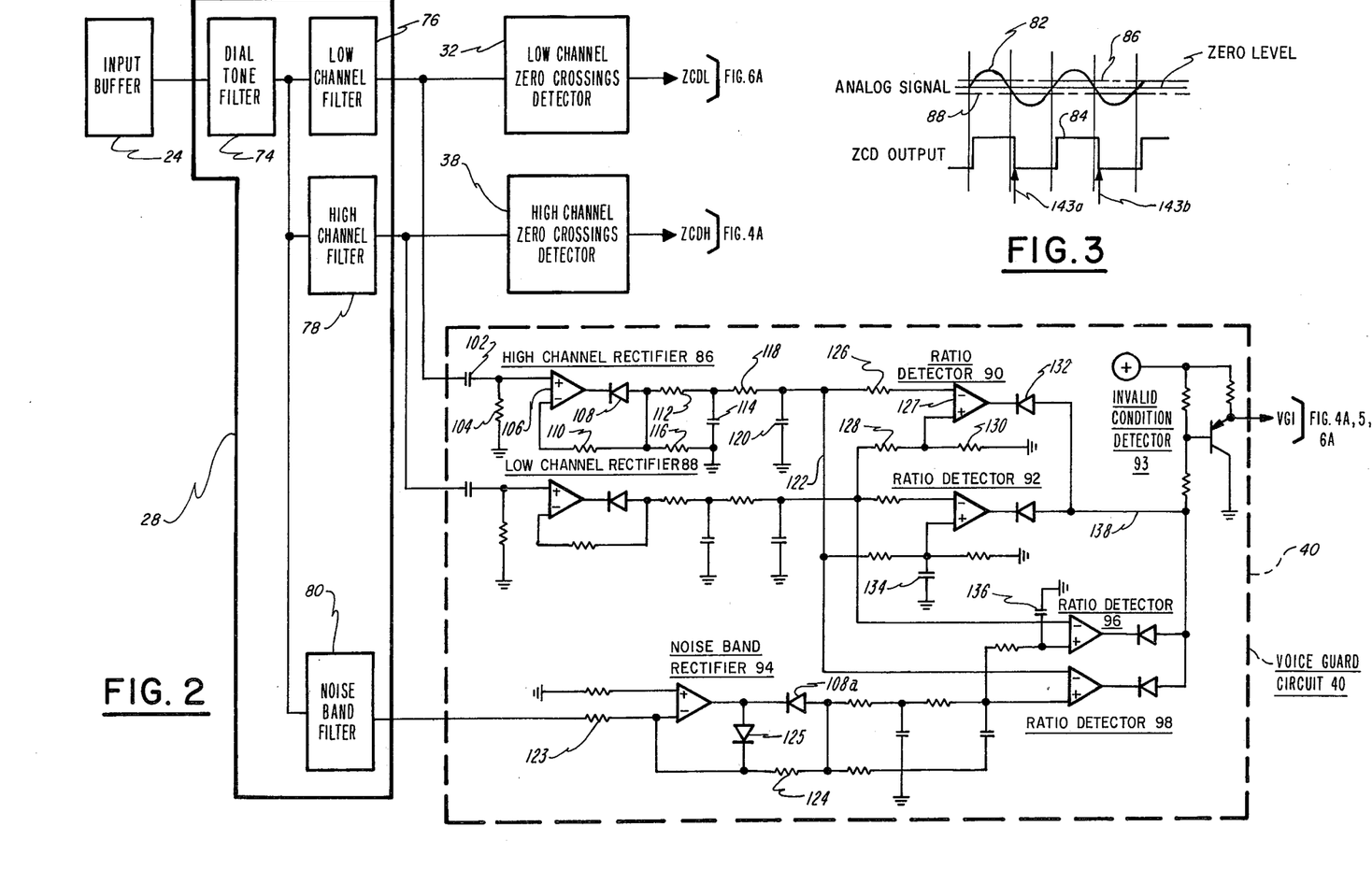
FIG. 2 is partially a block diagram and partially an electrical schematic of certain analog signal processing circuits of the tone receiver of FIG. 1A.
FIG. 3 is a set of wave forms which diagrammatically illustrate the operation of a zero-crossing detector of the tone receiver of FIG. 1A.

Reference is now made to FIG. 2 for a more detailed description of input buffer 24, analog filters 28, voice guard circuit 40, and zero-crossing detectors 32 and 28. Input buffer 24 provides common mode rejection and its gain is chosen to make the signal level of its output appropriate for the dynamic range capabilities of the successive stages. A dial tone filter 74, included in filters 28, receives the signal from buffer 24. Dial tone filter 74 serves to reject the frequencies below the low channel band. These frequencies below the low channel band normally comprise dial tone signals, and any other undesired tones such as power line frequencies which are included in the differential signal. The output of the dial tone filter drives three other filters namely: (i) a low channel filter 76, (ii) a high channel filter 78 and (iii) the noise band filter 80. The gain through the low and high channel filters and the noise band filter must be held to within certain tolerances to assure proper operation of voice guard circuit 40. Filters 74, 76, 78 and 80 are of any of the well-known conventional types.

The output of the low channel filter 76 is also fed into low channel zero-crossings detector circuit 32 to convert the analog signal to a digital type of square wave. Circuit 32 is the well-known Schmidt-Trigger circuit. Th operation of crossings detector 32 is illustrted in FIG. 3, wherein wave form 82 is an idealized input signal and wave form 84 is an idealized digital output signal. A feature of the zero-crossing detector 32 is its hysteresis characteristic which governs the low end of the dynamic range of tone receiver 20. This hysteresis characteristic is produced by two threshold levels schematically shown as phantom lines 86 and 88, FIG. 3. The consequence of this hysteresis characteristic is that the zero-crossings detector does not recognize signal levels which do not reach those threshold levels. Thus, signals below this threshold limit will be rejected by the tone receiver. This eliminates low level cross talk signals. The output of high channel filter 78 is fed into high channel zero crossings detector 38, which is basically the same as detector 32.

The upper end of the dynamic range of tone receiver 20 is determined by the dynamic range of the analog circuits themselves. The gain of input buffer 24 is chose to assure that the maximum desired input differential signal falls within the dynamic range of the dial tone filter and low and high channel filters.

The input to voice guard circuit 40 comprise the outputs from low channel filter 76, high channel filter 78, and noise band filter 80. Voice guard circuit 40 operates to detect the presence of signals which are nonvalid detection conditions and to deliver an output signal, VGI, to indicate this condition. Output signal VGI is a digital logic signal having an ASSERTION state and NEGATION state.

Two basic types of conditions are used to form determinations of a nonvalid detection condition. One is a comparison of the amplitudes of the high channel and the low channel. The other is a comparison of noise, or more properly the signal level above the high channel band, with the high channel and the low channel, respectively. If the amplitude of this higher frequency component of the input signal exceeds approximately 25% of either of the lower bands, it is deemed that nonvalid detection condition is present. By operation on ratios of signal levels rather than fixed references, a wide dynamic range of this detection is provided and therefore signal dynamic range is not a limitng factor in applying this voice guard improvement feature.

A high channel rectifier 86 convertes the A.C. signal coming from the high channel filter 78 into a D.C. signal which varies substantially in accordance with the average of the voltage peaked amplitudes of the high channel signal. In the telecommunications art this is sometimes referred to as "peak detection". The same basic function is performed for low channel filter 78 by a low channel rectifier 88. The D.C. outputs of these rectifiers are applied to ratio detectors 90 and 92 which compare the amplitudes of one against a portion of the other. The result of this is to not cause presence of the ASSERTION state at the ratio detectors outputs as long as the respective ratios of the two signals being compared to not exceed a predetermined magnitude. That is, the output state of the voice guard circuit output signal, VGI, remains in its NEGATION state as long as the ratio does not exceed this magnitude. If a ratio exceeds the associated predetermined threshold, the VGI signal at the output of a VGI translator circuit 93 will change to its ASSERTION state indicating a nonvalid condition is recognized.

The other condition that is used to recognize a nonvalid condition involves the presence of signal energy above the high band of a certain amplitude. The output from the noise band filter 80 is coupled to a noise band rectifier 94 which performs the same basic function as described in conjunction with rectifier 86. The D.C. output from the noise band rectifier is applied to ratio detectors 96 and 98 for comparison of the noise power level with the high channel and low channel signals, respectively. The amplitude or gain through the noise band channel is set such that the ratio detector for the noise becomes compared with the high and low channel signals on a one-to-one basis.

In order to be compatible with these comparison operations, a signal in the high channel band representing a valid detection must be rejected by the noise band filter to a sufficient degree that it will not come through to the ratio detector with enough gain to produce an invalid indication. To insure that the signal in the high channel filter is thusly rejected, the "stop band attenuation rate" associated with the lowermost frequency limit of noise band filter 80 is made steep.

Reference is again made to FIG. 2, this time for a detailed description of voice guard circuit 40. At the input end of high channel rectifier 86 is an input coupling capacitor 102, which decouples a D.C. component of the high channel filter output. Resistor 104 provides a path to ground for bias currents of an operation amplifier 106. An output rectifier 108 does the rectification combination with the operational amplifier characteristics through a feedback loop. This feedback loop includes resistor 110 in order to form a quasi-perfect rectifier, namely one which has negligible forward drop. The output of the rectifier is fed through a resistor 112 to a capacitor 114, the values of which are chosen to provide the voltage peak averaging, and to resistor 116 to discharge the high channel rectifier filter for purposes of enhancing the recovery of the nondetected condition D.C. level. The output of the first stage of the filter is fed through a resistor 118 to another capacitor 120 in order to further smooth out ripple. The discharge time of the high channel rectifier 86 is made shorter than that of the low channel rectifier to reduce the time for the voice guard circuit 40 to produce a low output after the end of a tone burst. This speeds up processing and reduces voice simulation. Circuit 86 is basically a half-wave rectifier circuit. The output of circuit 86 is applied via a lead 122 to ratio detectors 90, 92 and 94.

The circuit components of low channel rectifier 88 are basically the same as those of rectifier 86. However, rectifier 88 does not have any resistor which corresponds to resistor 116 because there is not a requirement for fast discharge. The difference in discharge rates between high channel filter 86 and low channel filter 88 is the thing that enhances the recovery to a nondetected condition by forcing the two rectifier outputs to be different as soon as possible after the input signals are terminated.

The function performed by noise band rectifier 94 is similar to the functions of high and low channel rectifiers 86 and 88. However, it is implemented slightly differently in order to allow it to have its gain adjusted by means of setting resistors 123 and 124. A diode 125 in the feedback loop serves to prevent saturation of the operational amplifier when it is not driving the diode 108a in the forward direction.

The high channel rectifier output is applied through a resistor 126 to the ratio detector 90. Resistor 126 serves as an operational amplifier bias current compensation. The value of resistance of resistor 126 is selected to compensate for the effective impedance of the circuit feeding the other input of operational amplifier 127. Resistors 128 and 130 form a voltage divider from the output of low channel rectifier 88 to ground so that the high channel rectifier output is compared to a fraction of the low channel rectifier output. In the previously referred to exemplary embodiment of tone receiver 20, approximately one-third of the low channel output is compared with the high channel output. As long as the two signals are nearly the same, the ratio detector output will keep a diode 132 reverse biased, and therefore not cause signal VGI to change its ASSERTION state. If the high channel signal falls one-third of the low channel signal the output of ratio detector 90 will change to its ASSERTION state as the result of diode 132 being forward biased. This ratio detector 90 senses when the ratio of the low channel signal to the high channel exceeds approximately 3:1. This will pull the input to valid condition detector 93 negative causing the VGI signal to go to is ASSERTION state, which is the electrical LOW state. (At the output of operational amplifier 127, the ASSERTION state is the LOW electrical signal state.) It will become apparent as the description proceeds, a presence of the signal VGI in its ASSERTION state causes tone receiver 20 to be inhibited from detecting the condition presented to it.

Ratio detector 92 is basically the same as ratio detector 90. It allows a comparison between the high channel and low channel rectifier outputs and provides an AS- SERTION state output when the low channel amplitude falls below one-third of the high channel amplitude. In ratio detector 92 the signal presented at the high channel rectifier experiences less delay than that from the low channel rectifier. The use of a capacitor 134 inserts additional delay to compensate for the low channel signal delay. This prevents false changes of the VGI signal to its ASSERTION state at the tone burst leading edge.

Capacitor 136, in ratio detector circuit 96, is employed for a similar purpose. It prevents the detected noise from improperly causing an ASSERTION state at the output of the ratio detector 96 due to slowness of the low channel leading edge during a valid tone burst.

A negative going signal at the outputs of any of the ratio detectors couples through the corresponding diode to a lead 138. This pulls the input to the invalid condition detector 93 LOW, which in turn converts a level of approximately minus 4 volts to a logic-compatible low, namely, ground. VGI therefore is pulled to ground, which is the logical ASSERTION state at this point, whenever the lead 138 is pulled negative. This represents the nonvalid condition which inhibits tone receiver 20.

It should be appreciated that because the signals detected by the noise band filter are above the high channel filter range it is to be presumed that they are voice signals, as opposed to valid tone signals. Therefore they should be rejected as nonvalid detected conditions.

C. Digital Tones Detectors

Figure 4A:
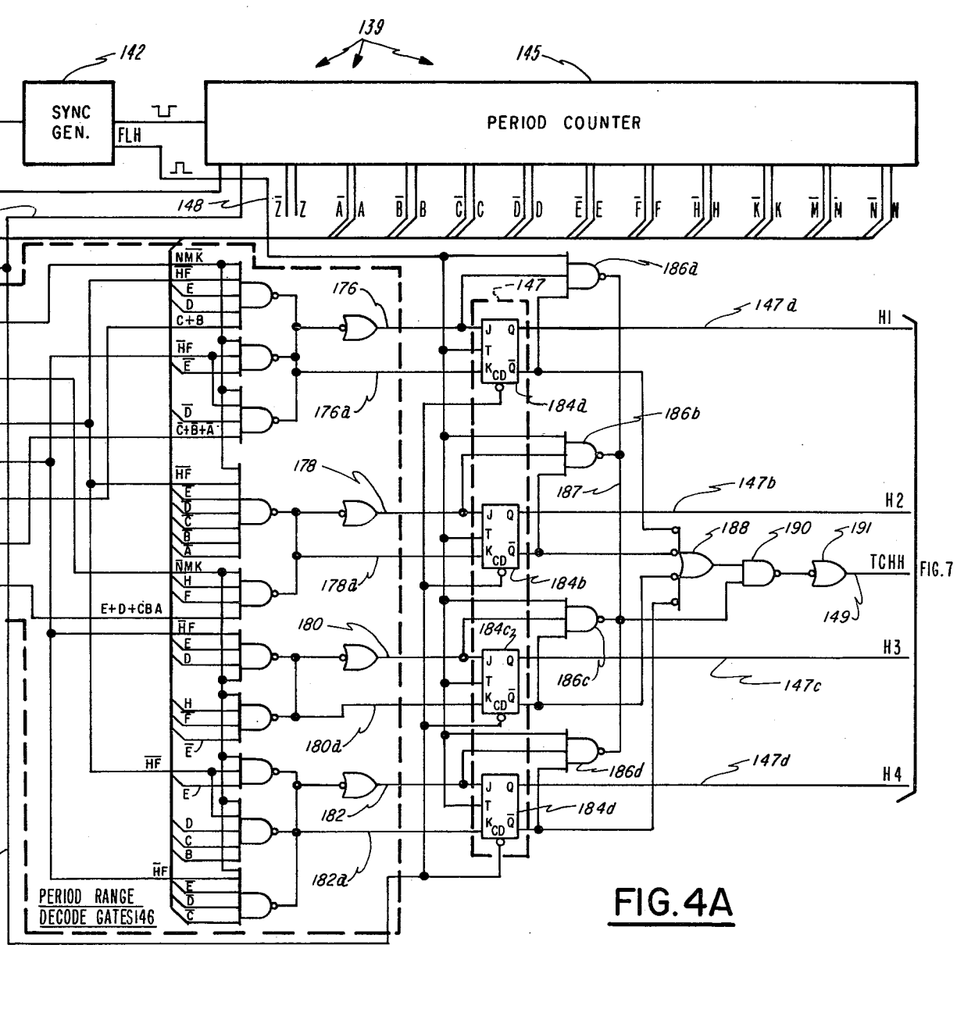
FIG. 4A is partially a block diagram and partially a logic circuit schematic of the high band digital tone detector of the tone receiver of FIG. 1A.

Reference is now made to FIG. 4A for a detailed description of a high band tone detector 139. High band detector 139 and a low band detector 139' (which is to be described in connection with FIG. 6A) together comprise digital tone detectors 36, FIG. 1. The basic input to high band tone detector 139 is signal ZCDH produced by high channel zero crossings detector 38, FIG. 2. Signal ZCDH is in its ASSERTION state when electrically HIGH (see signal 84, FIG. 3 and the symbolic positive pulse alongside lead 140 in FIG. 4A). Lead 140 couples signal ZCDH to a divide-by-four ($\div$ 4) counter 141, which divides a tone frequency by a factor of four (4) and presents it to a sync generator circuit 142. As will become apparent, digital sync generator 142 functions as a digital sequence generator. The square wave signal 84, FIG. 3, received along lead 140, will actuate $\div$ 4 counter 141 on a negative transition as illustrated by the arrows, 143a, 143b, FIG. 3. Sync generator circuit 142 synchronizes the change of the level of input signal ZCDH on lead 140 with the clock signal $\overline{5A}$, on lead 144. The synchronization process assures that no transition on lead 140 will be lost as a result of unfortunate "races" between the signal and clock edges. The sync generator resets a period counter 145 at a rate of one quarter of the input tone frequency. In between resets, the period counter is allowed to be advanced by the clock signal $\overline{5A}$ on lead 144.

Period counter 145 has eleven stages, Z, A, B, C, D, E, F, H, K, M, and N. The outputs of these stages A . . . N, are coupled to a set of period range decoder gates 146, which decode count conditions produced in the period counter in accordance with the Boolean period decoder logic statements shown in the table of FIG. 4B. The range defined for any one gate corresponds a center frequency equal to the precise frequency value of the tone to be detected, plus or minus 2 ½%.

The outputs of these gates is presented to a set 147 of frequency latch flip-flops, and are loaded therein by action of the sync generator 142 by a signal FLH coupled on lead 148 just prior to the time when the sync generator resets the period counter for another period count. Therefore, the frequency latches present their outputs H1, H2, H3, and H4 on leads 147a, 147b, 147c, and 147d until updated on the next count. It will be appreciated that this operation results in the period range decoder gates being able to introduce the SET state into only one frequency latch flip-flop at a time. Thus, there never can be two frequency latch flip-flops in their SET state at the same time.

The generation of the signal TCHH along a lead 149 will be described in detail in a subsequent paragraph. Briefly, however, signal TCHH indicates that any one of the individual frequency latches of frequency latches 147 has an ASSERTION state present at its set inputs. Further, if any of the four frequency latches change from a ZERO to a ONE state, signal TCHH will be inhibited momentarily.

A lead 150 from voice guard circuit 40, FIG. 3, receives its output signal, VGI and applies same to a divide-by-four preset circuit 152. Upon application of an ASSERTION state on lead 150, the divide-by-four preset circuit 152 will preset $\div$ 4 counter 141 to a state such that the next negative going transition on lead 140 will cause counter 141 to trigger sync generator 142.

Associated with counter 145, but not part of period range decoder gates 146, is another count state decoder 154. Gate 154 is responsive to a predetermined end-of-count (EOC) output state of period counter 145 which is somewhat above that for the highest count for any valid tone, namely somewhat above the count condition 1132. When the EOC state is reached, gate 154 will apply an ASSERTION state signal to period counter 145 via a lead 156. The receipt of an ASSERTION state signal on lead 156 causes period counter 145 to inhibit all further count stepping inputs. Counter 145 will stop until it is reset by normal operation of sync generator 142.

The purpose of $\div$ 4 counter 141 is to average the effect of a jitter conditon found to be present on input lead 140. The principle which is employed is that the jitter is nonaccumulative over a succession of input cycles. Therefore the magnitude of the jitter as a percentage function is diminished by taking this average. The factor of four (4) was found to be a reasonable compromise among minimizing the percentage jitter and introducing excessive delay in the signal processing.

As described, the divide-by-four preset circuit 152 acts to set the $\div$ 4 counter to its state just prior to that which triggers the sync generator 142, which is the 1—1 state of the $\div$ 4 counter. This function of preset circuit 152 minimizes delay in processing a valid tone on input lead 140. This is particularly important in the situation of the beginning of a tone burst preceded by a nonvalid condition. It is desirable to minimize the delay in reacquiring the valid tone condition when such valid tone does start again.

Lead 156 from the end-of-count condition decoder gate 154 is additionally coupled to the frequency latches 147 to reset these latches when the period counter has advanced beyond valid tone states. This assures that at an end of a tone burst the latches are reset and thereby inhibit their outputs. Inhibiting the outputs of the latches in turn indicates to subsequent circuitry that a nontone condition exists.

Leads 153 are decoded to detect a period counter state between 1132 and that detected by gate 154 to initialize the ÷ 4 counter at the end of a tone burst, to minimize delay in processing the next tone burst.

As stated earlier the application of an ASSERTION state from EOC decoder gate 154 to period counter 145 via lead 156, causes the period counter to be blocked. This in effect readies and prepares high band tone detector 139 for receipt of the next subsequent signal on lead 140 which effects the initialization of the detector.

Figure 5:
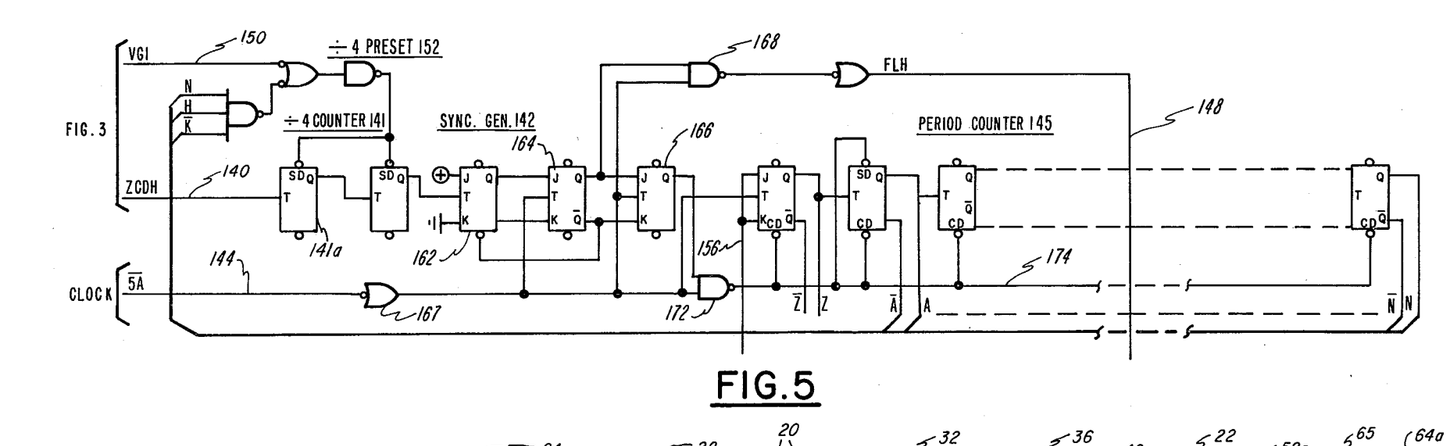
FIG. 5 is a logic circuit schematic showing in greater detail a portion of the tone detector of FIG. 4A.

Reference is now made to FIG. 5 for a more detailed description of divide-by-four preset circuit 152, divide-by-four counter 141, sync generator 142, and period counter 145.

By keeping period counter 145 in a static condition prior to receipt of a new tone burst, divide-by-four counter 141 is assured to be in a state able to receive the first negative transition on lead 140 without any danger of a simultaneous inhibit being applied through the divide-by-four preset feedback from the period counter.

Divide-by-four counter circuit 141 is a two-stage ripple counter which is operated by signal ZCDH received via lead 140. More specifically counter 141 is triggered by the negative going edge of signal ZCDH's wave form 84, FIG. 3. The ÷ 4 counter 141 normally "toggles through" one ASSERTION state signal for each four cycles of a tone signal. The output of counter 141 is directly coupled to the trigger of a flip-flop 162 in the sync generator 142. The J-K inputs of flip-flop 162 are permanently biased such that it always is triggered to its SET state by the output of counter 141. Once set, flip-flop 162 presents a SET state to a second flip-flop 164 (also part of sync generator 142). The next succeeding trailing edge of the signal 5A, is received on lead 144 and is inverted by the inverter 167. The output of inverter 167 loads the SET state from flip-flop 162 into flip-flop 164. This enables an input to a gate 168, (also part of sync generator 142). At the next succeeding pulse time of signal 5A on lead 144, gate 168 applies a load pulse signal FLH to the frequency latches 147 via lead 148. The trailing edge of the signal 5A pulse that actuates gate 168 to provide an ASSERTION state on lead 148 also clocks a ONE or HIGH state into a third flip-flop 166 (also part of sync generator 142). However, once flip-flop 164 is clocked to its SET state, the flip-flop 162 provides a resetting action causing flip-flop 164 to remain in a SET state for only one clock cycle, after which the RESET state of flip-flop 162 causes flip-flop 164 to be loaded with the RESET condition. On the next successive clock cycle this RESET condition is then loaded into flip-flop 166. However, for the duration of time flip-flop 166 is in the SET state, it enables a gate 172 which applies a RESET input to the period counter 145 via a lead 174.

It will be appreciated that flip-flop 141a of ÷ 4 counter 141 may be considered as part of what is broadly meant by the term "zero-crossings detector". Flip-flop 141a is the circuit which detects the negative going excursions indicated by arrows 143a, 143b, FIG. 3. Therefore, under such broader definition of "zero-crossings detector", flip-flop 141a comprises a means for deriving an output pulse from each excursion of the rectangular wave form 84, FIG. 3 in a predetermined one of opposite directions of excursion across the nominal axis of oscillation of the rectangular wave form.

As long as lead 156 remains HIGH, the eleven stage period counter 145, consisting of flip-flops Z, A, B, C, D, E, F, H, K, M, and N is allowed to be clocked through the action of signal 5A received on lead 144. In the previously referred to exemplary embodiment, the clock occurs every 3 microseconds.

The output state of the period counter is read out through the period decoder gates 146, FIG. 4A, and then one cycle later the period counter is reset. If the period counter reaches a code or a state that causes leads N, H, and K̄ to assume their respective ASSERTION state, the divide-by-four preset circuits will apply an ASSERTION state to set direct (SD) inputs of the flip-flops of the ÷ 4 counter to set it to its so called "1—1" state. (This is the state of a ÷ 4 counter such that the next effective transition on lead 140 will cause counter 141 to trigger sync generator 142.)

Similarly, receipt of an ASSERTION state of signal VGI on lead 150 will also preset the ÷ 4 counter. By thusly causing the ÷ 4 counter to be preset to its 1—1 state prior to receipt of a valid tone signal, the divide-by-four counter is prevented from introducing a random delay type of ambiguity into a sequence of valid period detections. Particularly in the low band detector 139', FIG. 6, this delay can amount to the better part of 5 milliseconds, and therefore significantly degrade the detection quality.

Figure 4B:
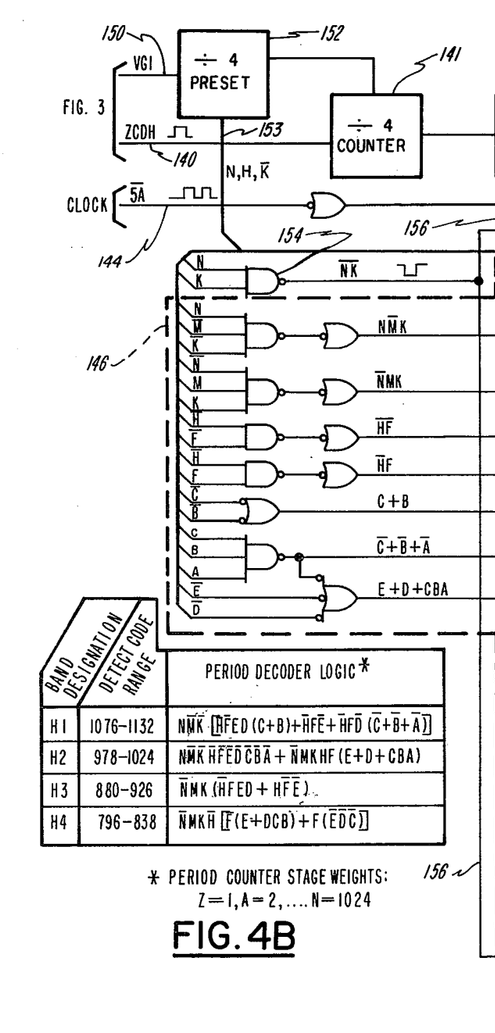
FIG. 4B is a table presenting Boolean statements which are descriptive of the operation of period range decoder gates of the tone detector of FIG. 4A.

The period range decoder gates 146, FIG. 4A, implement the Boolean expressions defined in FIG. 4B to provide recognition of a range of frequencies for each of the four tone frequencies in the high channel. The range for any one frequency corresponds to about plus or minus 2½% of the frequency. The outputs from the period range decoder gates 176 and 176a, 178 and 178a, 180 and 180a, and 182 and 182a represent the detection of a frequency if the period counter setting falls within the range corresponding to a specific frequency of interest.

It will be appreciated that the effect of reducing the average percent of jitter by means of divide-by-four counter 141 is to reduce the range required in the period decoder gates to assure that a given frequency is reliably detected. Stated another way, without divide-by-four counter 141, it would be necessary to increase the frequency range that must be detected for each tone to insure that the tone is reliably recognized in the presence of jitter. This allows reliable detection of a given range of a given tone without requiring that the detection maximum range be excessive. Stated still another way, the effective band pass of the tone detector can be made narrower by employing this averaging technique than would otherwise be possible. By permitting a narrower bandwidth, the recognition of tones outside of desired tolerances relative to the nominal tone frequency is minimized.

Frequency latches 147 comprise individual flip-flops 184a, 184b, 184c, and 184d. Associated with flip-flops 184a . . . 184d are a corresponding set of change detection gates 186a . . . 186d. Once every four tone signal cycles, the period counter setting is decoded by the period range decoder gates 146 and loaded into the frequency latch flip-flops 184a . . . 184d.

Any time that a particular frequency latch flip-flop is changed from a RESET state to a SET state, the corresponding gate of gates 186a . . . 186d detects this change of state. A common output lead 187 from gates 186a . . . 186d provides an OR function. By means of this OR function the detection of a change of state causes AND gate 190 to be inhibited. Any of the frequency latch flip-flops 184a . . . 184d that are in a SET state will present an ASSERTION state at the input to gate 188, which is an OR gate which normally presents an ASSERTION state to lead 149 through gate 190 and inverter 191. Lead 149 carries the signal TCHH. However, whenever a latch changes from a RESET to a SET state the OR function of lead 187 acting through AND gate 190 will cause lead 149 to be momentarily in its NEGATION state. Stated another way, when any of the latching flip-flops are changing from a RESET to a SET state, the TCHH signal will go to its NEGATION state momentarily. This assures that the TCHH output is inhibited for the case in which one latching flip-flop is being set at the same time another latching flip-flop is being reset as part of the same change of latches states. It will be appreciated that the discrete latching periods of the individual latched flip-flops 184 are related to the intervals between axis crossings of the input signal. It will be further appreciated that gates 186a . . . 186d and the OR function of lead 187 is a means responsive to the condition of any individual latching flip-flop 184 being in the situation of its existing state indicating absence of a tone, while its input is being set up to change its state to one indicating presence of a tone for the next latching period.

Figures 6A, 6B:
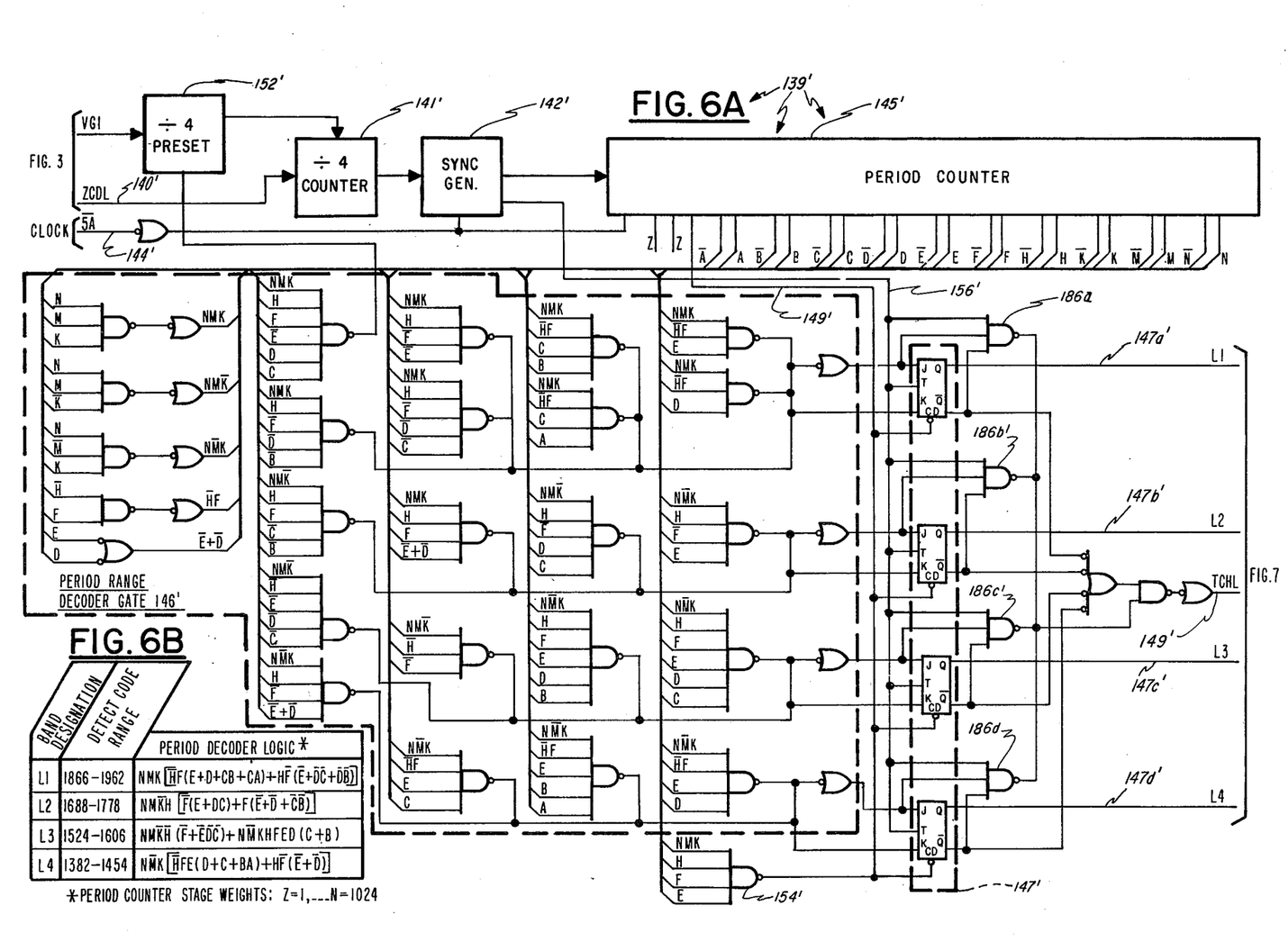
FIG. 6A is partially a block diagram and partially a logic circuit schematic of the low band tone detector of the tone receiver of FIG. 1A.
FIG. 6B is a table presenting the Boolean statements which are descriptive of the operation of the period range decoder gates of the tone detector of FIG. 6A.

Low band tones detector 139', FIG. 6A, is basically the same as high band tones detector 139. The reference numerals shown in FIG. 6A are the same reference numerals as have been given to the corresponding parts in connection with the description of tones detector 139, FIG. 4A, except that a prime (') is suffixed. One of the principle differences is that the interconnection of the outputs of period counter 145' to period range decoder gates 146' is in accordance with the Boolean logic statements shown in FIG. 6B. Also, the Boolean statements for the divide-by-four preset 152' are different, and the Boolean statements for EOC gate 154' (located at the bottom center of the drawing in FIG. 6A) are different. Since high band tone detector 139 and low band tone detector 139' are responsive to different input tones, the latching periods of frequency latches 147 are unique to the respective digital tone detectors.

D. Coincidence Timer, 2-of-8 Binary Converter, and Output Register 65

Figure 7:
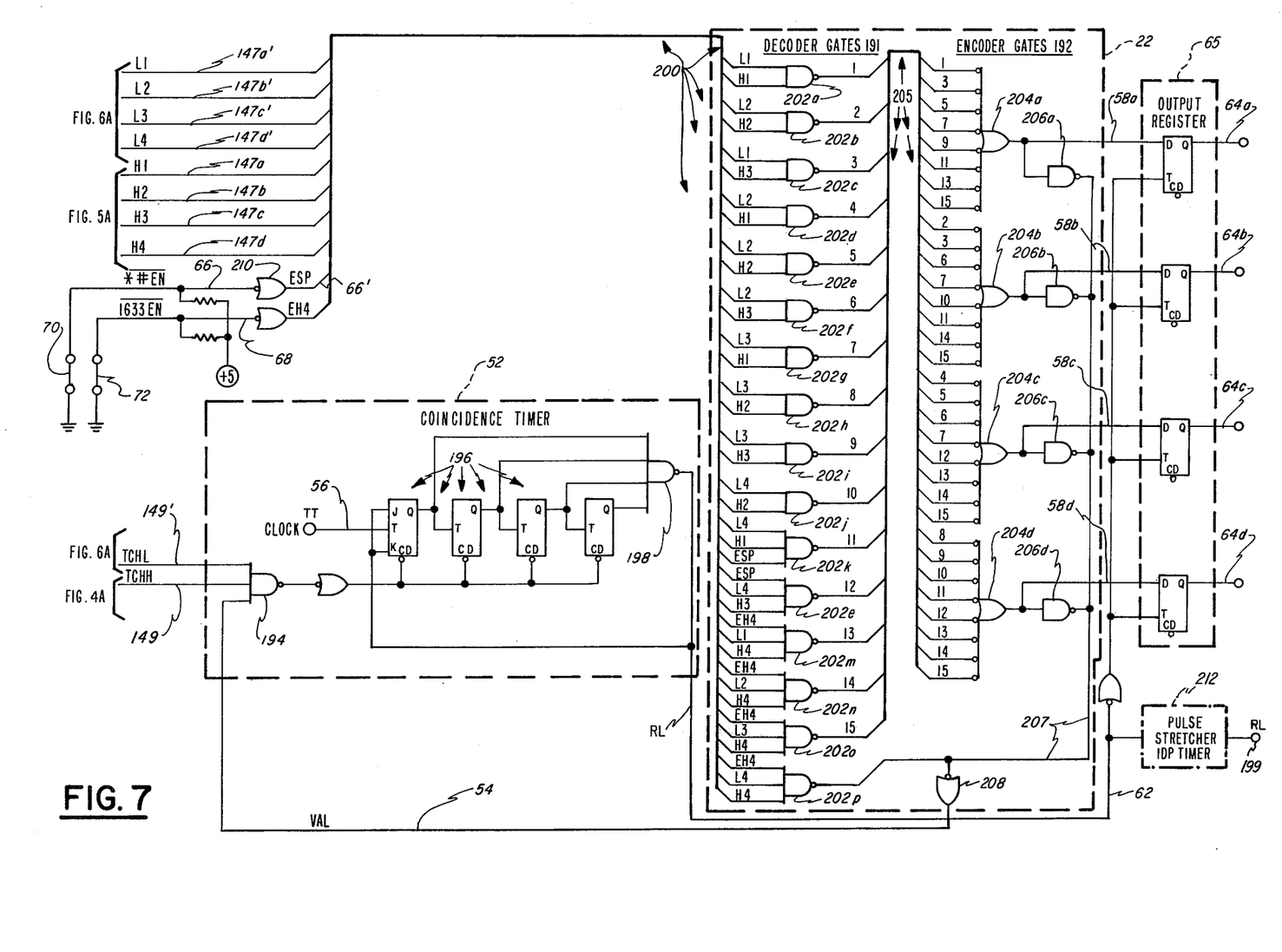
FIG. 7 is a logic circuit schematic of the 2-of-8 to binary converter, coincidence timer, output register, and certain other adjoining components of the tone receiver of FIG. 1.

Reference is now made to FIG. 7. Coincidence timer 52 receives the signals TCHL and TCHH via leads 149' and 149 respectively. The presence of an ASSERTION state of both signals TCHL and TCHH is an indication that a tone has been detected in each of the high and low band channels. Detectors 139, 139', FIGS. 4A and 6A, also provide output signals indicating which tones are detected. These are received via leads 147a . . . 146d and 147a' . . . 147d', and applied to 2-of-8 to binary converter 22. There, the individual tone combinations are decoded (or detected) and recoded into a binary format for application to the output register 65. Output register 65 is an output buffer means for providing a four digit binary code tone receiver output signal which represents the tone combination which is detected. The output register 65 is loaded under the control of the coincidence timer 52. The output of coincidence timer which provides this control is a signal RL on lead 62. There are two other inputs to converter 22, namely leads 66 and 68 which serve to alternatively allow or inhibit the detection of certain subsets of combinations of the low and high band frequencies, depending upon the optional presence or removal of conductive links 70 and 72. The optional removal of one, or the other, or both, of conductive links 70 and 72 constitute an adjustment to the circuit which may be done as a post manufacturing step.

As stated previously, the signal RL provided along lead 62 provides an indication to external equipment that a new tone combination has been detected and that it does reside in the output register 65. The leading edge of the pulse wave form carried by lead 62 loads output register 65 and the trailing edge of that pulse wave form is the indication to the utilization circuit that a new tone combination was detected and resides in the register.

The 2-of-8 to binary converter 22 has two main parts consisting of a set of tones combinations decoder gates 191, and a set of encoder gates 192. Output register 65 constitutes a means for coupling an indication of the output states of the decoder gates to the utilization circuit. This indication of the output states of the decoder gates is in the form of a multiple digit binary word, as will be described. The tones combinations decoder gates each present an ASSERTION state at one of their outputs in recognition of a particular tone input combination. If a valid tone combination is detected, and a removal of conductor link 70 or 72 does not operate to inhibit it, the VAL signal will be in its ASSERTION state along a lead 54 from converter 22. As will become apparent as the description proceeds, the simultaneous presence of a VAL signal in its ASSERTION state together with both signals TCHL and TCHH being in their ASSERTION states allows the coincidence timer to start its timing function. If the enabling condition, namely simultaneous presence of ASSERTION states of TCHL, TCHH and VAL is maintained continuously for the time required by the coincidence timer, the timer will cause an ASSERTION state to be provided at output lead 62. As stated previously, the leading edge of this ASSERTION state pulse loads output register 65. When either one or the other of the inputs 149 or 149' then change to the NEGATION state, the coincidence timer enable signal will change to its NEGATION state producing a trailing edge to the pulse on lead 62. This terminates the indication of a detection of a tone and in turn allows the external utilization circuit to perform its processing of the data contained in output register 65. This data on leads 64a . . . 64d is a plural digit binary coded form of the data presented in the form of the tone combinations at the tone receiver input.

Reference is again made to FIG. 7, this time for a more detailed description of coincidence timer 52. Its principal parts are an enabling gate 194, an input lead 56 for receiving a clock signal TT, and a four binary ripple counter 196. The bias condition on the input leads 149, 149', and 54 are NEGATION state input levels and the coincidence timer is thereby normally clamped to a reset state. When an ASSERTION state is supplied by gate 194, the clock input on lead 56 is allowed to advance the ripple counter at the rate of one step per clock cycle. When the coincidence timer output condition reaches a state of all ONEs, the output side an output gate 198 changes to an ASSERTION state. This blocks the input to the counter chain and changes signal RL on lead 62 to its ASSERTION state, thereby loading the output register and providing signal RL in its ASSERTION state at output terminal 199.

When one or both of the input tones is removed, the coincidence timer 52 will be reset through a NEGATION of gate 194. This signals to the external utilization circuit load that the received tones burst has terminated. As stated earlier, this is done by means of a change at the output of gate 198 to a NEGATION state, and therefore causes a change to the NEGATION state of signal RL on lead 62. The external utilization circuit further interprets this state change as an indication that the utilization circuit can use the data received during that tone burst.

The individual high band and low band tone signals on input leads 147a ... 147d ... and 147a' ... 147d' are connected by any suitable interconnecting network 200 to the individual gates of decoder gates 191. The individual tone combination decoder gates 202a ... 202p detect the coincidence of tones presented from the high channel and low channel detectors as indicated by the alphanumeric symbols shown adjacent to the input leads in the drawing. (Decoder gates 202 may hereinafter and in the claims sometimes be referred to as "detector gates".) When one of the tone combinations for which a decoder gate is wired exists, its output side will be at the ASSERTION state. The outputs of decoder gates 202a ... 202p are designated by arabic numerals 1 through 15, and 0 respectively, as shown adjacent to each output lead on the drawing.

Encoder gates 192 comprise OR gates 204a ... 204d and an interconnecting network 205 which connects the outputs of gates 202a ... 202o to individual inputs of the various OR gates 204a ... 204d in the conventional manner for encoding a series of mutually exclusive outputs into a multiple digit binary word. The respective interconnections provided by interconnecting network 205 are indicated by the arabic numeral adjacent to each gate input of the OR gates, which correspond to the arabic numerals representing outputs of gates 202a ... 202n. It is to be noted that the output of OR gate 202p, whose output is designated by the arabic numeral 0, is not connected to an input of OR gates 204a ... 204d. The reason that the decoder gate 202p need not be connected with encoder gates 192 is that presence of an ASSERTION state at its output is equivalent to presence of a NEGATION output state at all outputs of gates 204a ... 204d, or the binary 0000 state. The latter 0000 state is designated to be the unique binary code output combination which represents an ASSERTION output at gate 202p. It is further to be noted that all other other combinations of output states of OR gates 204a ... 204d have at least one ASSERTION state present at the output of one of the OR gates. The principle underlying this construction is that the absence of an ASSERTION state at the outputs of gates 202a .. 202o is presumed to be due to the presence of an ASSERTION state at the output of decoder gate 202p. This construction performs the encoding with a minimal number of components.

The presence of an ASSERTION state at any of the outputs of decoder gates 202a ... 202p causes the signal VAL along the lead 54 to be in its ASSERTION state. This is done by ORing the output from decoder 202p with the outputs from encoder gates 204a ... 204d. A series of inverters 206a ... 206d and a common output lead 207 form a so called "wired" OR function in combination with the output of decoder 202p. This wire OR function acting through an inverter 208 propagates the presence of an ASSERTION state at either of: (i) the outputs of encoder gates 204a ... 204d, or (ii) the output of decoder gate 202p as an ASSERTION state of the VAL signal on lead 54.

In principle, the VAL signal on lead 54 could be generated by ORing together the outputs from decoder gates 202a ... 202p directly. Also as an alternative to employing the encoder to convert the decoder outputs to a multiple bit binary code, the decoder gate outputs could be connected directly, or through an output register, to provide the signals to the utilization circuit.

The operation of 2-of-8 to binary converter 22, coincidence timer 52, output register 65, and the provision of the VAL signal by the wired OR function comprising inverters 206a ... 206d and lead 207 will now be described in their relation to the adjustable feature of post manufacture adjustment of the circuit by removable link 70. Depending upon the presence or absence of removable conductive link 70, input lead 66 is alternatively strapped to ground or to a +5 volts bias source. (Lead 66 through inverter 210 supplies an input on lead 66' to interconnecting network 200.)

Assume that input lead 66 is left in an electrical HIGH state by removal of conductive link 70. The presence of either tone combinations L4, H1, or L4, H3 will cause the presence of signals TCHH and TCHL in their ASSERTION state on leads 149 and 149'. However the presence of their NEGATION state at lead 66 (a HIGH electrical state at this point) is propagated through inverter 210 to cause a NEGATION state at the ESP inputs of gates 202k and 202l. This inhibits the propagation of an ASSERTION state through these gates. It will be appreciated that when conductive link 70 is removed, lead 66 constitutes a fixed logic state bias source to provide a NEGATION state input for fixedly inhibiting any decoding by gates by 202k and 202l. As a result, there will be no ASSERTION state presented to the wired OR function comprising inverters 206a ... 206d and lead 207. Thus, the VAL signal on lead 54 will be in its NEGATION state. Enable gate 194 of the coincidence timer 52 will not propagate an ASSERTION state so that coincidence timer will remain in its RESET state and will not produce an ASSERTION state along lead 62. As a consequence, the individual flip-flops of output register 65 will not be loaded or toggled, and therefore will not store the states of the outputs of OR gates 204a ... 204d. The auxiliary output signal RL available to the utilization circuit will be in its NEGATION state indicating that the register 65 has not been loaded with a new signal. It is to be appreciated that this result is produced despite the fact that tone combinations L4, H1 and L4, H3 at leads 147a ... 147d, and 147a' ... 147d' would otherwise be mistakenly recognized as a valid output.

Assume now that removable conductive link 70 is in the position shown in the drawing in which it "straps" or "jumpers" input lead 66 to ground. This causes the ASSERTION state (a LOW electrical state) to be present at lead 66, which is propagated via lead 66' to the ESP inputs of gates 202k and 202l as ASSERTION states. Thus, any time either the tone combination L4, H1, or L4, H3 are present, the ASSERTION state will be present at the output side of gates 202k or 202l, respectively. In turn, there will be an ASSERTION state presented to the wired OR function comprising inverters 206a ... 206d and lead 207, and the VAL signal on lead 54 will be in its ASSERTION state. Enable gate 194 of coincidence timer 52 will propagate an ASSERTION state so that an ASSERTION state will be provided along lead 62 when counter 196 is timed out. As previously stated, presence of an ASSERTION state along lead 62 causes the output register 65 to load to the states of the output sides of OR gates 204a ... 204d. This occurs at the onset of the ASSERTION state pulse along lead 62. When the signal along lead 62 next changes to a NEGATION state, this will be an indication to any utilization circuit (via terminal 199) that register 65 has been loaded to represent a valid detected tone combination.

It will be appeciated that removable conductive link 66 comprises an adjustable logic signal means which may be adjusted between one condition on which it applies an ASSERTION state to the ESP gate inputs of gates 202k and 202l to another condition in which applies a NEGATION state to such gate inputs.

Input lead 68 and optionally removable conductive link 72 performs a similar function in alternatively enabling or inhibiting the subset of decoder gates comprised of decoder gates 202m . . . 202p.

It will be appreciated that the operation of the wired OR function comprising inverters 206a . . . 206d and lead 207 in conunction with coincidence timer 52 and output register 65 constitute an inhibitor means. This inhibitor means is operative to inhibit the coupling of the indication of the output states of the decoder gates from output register 65 to the utilization circuit means, or external load.

It will be appreciated that the OR function comprising inverters 206a . . . 206d and lead 207 also serves to differentiate between the condition of receipt of the valid tone combination L4, H4 resulting in an ASSERTION state at the output of decoder gate 202p, from the condition of absence of any valid tone combination among outputs 147a . . . 147d, and 147a' . . . 147d' from decoders 36.

The operation of digital tone detectors 36, 2-of-8 to binary converter 22, coincidence timer 52, output register 65, and the OR function comprising inverters 206a . . . 206d and lead 207 will now be described in relation to the possibility of a shift in the input from one valid tone combination to another without any interruption therebetween in the input signal. Assume that somehow the input signal shifts from the tone combination of L1, H1, to L1, H3 without any interruption therebetween in the input signal. There will be a continuous presence of signal TCHL in its ASSERTION state on lead 149' since the continuous presence of tone L1 will cause latch flip-flop 184a' of tones detector 139', FIG. 6A to remain in its latched condition. However, within tones detector 139, FIG. 4A, the shift from tone H1 to tone H3, will cause the changes in the latched states of flip-flops 184a and 184c. This will cause signal TCHH on lead 149 to momentarily be in its NEGATION state. In turn, enable gate 194 of coincidence timer 52 will momentarily present a NEGATION at its output. The coincidence timer 52 is therefore RESET and this will cause signal RL on lead 62 to change to its NEGATION state. If the new tone combination is present for the duration of time it takes ripple counter 196 to reach its timed out condition, the RL signal will return to its ASSERTION state. The leading edge of this signal will load the flip-flops of output register 65 to receive the new signal. The trailing edge of this signal, (at the end of the tones burst) will indicate to the utilization circuit that registers 65 are loaded with a valid signal. This resetting of coincidence timer in response to an uninterrupted shift of tones is important in enhancing voice guard action within the tone receiver 20. For example, in the event a tone signal inadvertently slides to one of the predetermined tones during tone signalling, the coincidence timer will be reset, thereby preventing mistaken recognition of the tone sequence as one continuous valid detection.

It will be appreciated that frequency latches 147, FIG. 4A, composed of flip-flops 184a . . . 184d, and the associated change detection gates constitute a means responsive to a change in the output state of any of the individual outputs of tone detector 139 from predetermined one of the two output states to the other of the two output states to apply a reset signal to coincidence timer 52. The resultant NEGATION states in signal TCHL or TCHH constitutes a tone combination change pulse.

It will also be appreciated that frequency latches 147 of digital tones detector 139, and 147' of the digital tones detector 139', and their respective associated latches in conjunction with the operation of 2-of-8 to binary converter 22, coincidence timer 52, and output register 65 comprises an interrupter means. This interrupter means, in the event of a new appearance at the output of any individual decoder (or detector) gate of an ASSERTION state, is operative to introduce an interruption in the coupling of the indication of output states from the output register to the utilization circuit.

It will further be appreciated that the logic within tone combinations detectors 139 and 139' which produce signal TCHH and TCHL, the OR gate function of gates 206a . . . 206d and lead 207, and gate 194 comprise a means for enabling the tone receiver output signal at register 65 in response to presence of an ASSERTION state among the outputs of the decoder (or detector) gates 202a...202p.

It will still further be appreciated that since signal RL at the output of coincidence timer 52 is a combination of the two actions described in the preceding two paragraphs, the organizations which provide these two actions comprises a means for enabling the tone receiver output signal in response to presence of an ASSERTION state among the outputs of said set of decoder (or detector) gates and for interrupting any enablement of the output signal in response to each new appearance at the output of any individual decoder (or detector) gate of an ASSERTION state. The enablement of the output signal is subordinated to the interruption of the signal.

If desired, signal RL on lead 62 can be further processed before delivery to the utilization circuit via terminal 199 by means of a pulse stretcher or an interdigital pause (IDP) timer 212 (in phantom). This would fill in gaps in the signal on lead 62 in the event of short interruptions of the valid tone signal. It is to be noted that this will effectively cause coincidence timer 52 to provide a validity confirmation signal despite short interruptions of the valid tones. Stated another way, coincidence timer 52 as modified by operation of a pulse stretcher or IDP timer 212, would provide a validity confirmation signal upon substantially sustained existence of a valid tone combination.

An advantage of the arrangement of coincidence timer being responsive to a change in output latch condition of tone detectors 139, 139' is that there is an improvement at the leading edge of a tone burst if the period range decoder gates momentarily falsely present the indication of one of the tones through the "ringing" of the gates (which are digital selective filters). This momentary false indication will be followed by detection of the true frequency. Use of the changing state of a latch to reset the coincidence timer minimizes any delay of recognizing initial presence of a valid tone combination at the input. This in turn minimizes the delay of propagation of the consequent logic signals to coincidence timer 52. This maximizes the valid detection time during which the coincidence timer may make its duration determination.

The invention has been illustrated with regard to 2-of-8 type tone code, and with regard to coincidence timer 52 performing the standard telephone system duration determinations of the 2-of-8 code. However, it will be appreciated that the principles could be applied to other tone coded systems as well, and/or with implementations of the different coincidence duration determinations.

There is another advantage of the described cooperation of the output coupling circuitry of 2-of-8 binary converter 22, coincidence timer 52, output register 65, and the OR function comprising inverters 206a...206d and lead 207. This advantage is that the output circuitry is capable of universal use in all 2-of-8 tone signal applications, rather than requiring unique designs for the several versions which exclude different subsets of tone combinations. The capability is provided by leads 66 and 68, removable conductive links 70 and 72, and the provision of an additional gate input in the appropriate tone combination decoder gates 202. This feature is important because normal station-to-station call procedures do not use all of the tone combinations of the 2-of-8 tone signal system.

It will be understood by those skilled in the art that numerous variations and modifications may be affected to the preferred embodiment without departing from the spirit and scope of the invention hereinafter claimed.

What is claimed is:

1. For use in a signal system in which a frequency band may carry any one of a predetermined set of tones of differing frequencies, a tone detector comprising:
   a. zero-crossing detector means having an input connected to receive the signal in said frequency band, said zero-crossing detector means providing a train of pulses representing analog excursions of a tone signal across the nominal axis of oscillation of the tone signal,
   b. counter means for timing tone signal cycle intervals having a reset input and a count stepping input,
   c. a source of a high speed clock signal drivingly connected to the count stepping input of the counter means,
   d. a corresponding set of frequency range decoder gates responsive to predetermined ranges of output count conditions, said set of decoder gates being responsive to said output count conditions of the counter means as they exist at a time in a predetermined timed relationship to the time when the counter means reset input is actuated, and
   e. a ÷ N pulse frequency divider, the output of said zero-crossing detector means being propagated to the reset input of said counter means through the ÷ N pulse frequency divider, whereby the interval timed by the counter means is N times the interval of an individual cycle of a received tone signal.

2. Apparatus in accordance with claim 1, wherein;
   a. said zero-crossing detector means is of a type operative to provide an output pulse for each analog excursion of a tone signal across the nominal axis of oscillation of analog excursions in a predetermined one of opposite directions of excursion across said axis.

3. Apparatus in accordance with claim 1, wherein;
   a. said zero-crossing detector means includes a Schmidt-Trigger type of circuit which converts the analog excursions of the tone signal to a rectangular wave form output having one and another output levels, said one and another output levels generally corresponding to the one and another polarities of the analog excursions of the analog tone signal relative to the nominal axis of oscillation of the analog tone signal.

4. Apparatus in accordance with claim 3, wherein;
   a. said zero-crossing detector means includes circuit means for deriving an output pulse from each excursion of said rectangular wave form in a predetermined one of opposite directions of excursion across the nominal axis of oscillation of said rectangular wave form output.

5. Apparatus in accordance with claim 3, wherein;
   a. said Schmidt-Trigger type of circuit has predetermined hysteresis characteristics to thereby reject nonvalid low level signals.

6. For use in a signal system in which a frequency band may carry any one of a predetermined set of tones of differeing frequencies, a tone detector comprising:
   a. zero-crossing detector means having an input connected to receive the signal in said frequency band, said zero-crossing detector means providing a train of pulses representing analog excursions of a tone signal across the nominal axis of oscillation of the tone signal,
   b. period counter means having a reset input and a count stepping input,
   c. a source of a high speed clock signal drivingly connected to the count stepping input of the period counter means,
   d. a corresponding set of frequency range decoder gates responsive to predetermined ranges of output count conditions, said set of decoder gates being responsive to said output count conditions of the period counter means as they exist at a time in a predetermined timed relationship to the time when the period counter means reset input is actuated,
   e. a ÷ N pulse frequency divider, the output of said zero-crossing detector means propagated to the reset input of said period counter means through the ÷ N pulse frequency divider,
   f. each frequency range decoder gate of said set has operatively associated therewith a digit store device operative to store the output state of the decoder gate after the period counter means is reset,
   g. means for loading the output states of the set of decoder gates into their associated digit store devices, said means for loading being so constructed and arranged to cause the output states to be loaded in the associated digit store device in a first predetermined timed relationship to the appearance of each output pulse at the output of the ÷ N pulse frequency divider,
   h. means for coupling the output pulses of the ÷ N pulse frequency divider to the reset input of said period counter means, said means for coupling being so constructed and arranged to cause said output pulse to appear at said reset input in a second predetermined timed relationship to the appearance of each output pulse at the output of the ÷ N pulse frequency divider, and
   i. said second predetermined timed relationship lags said first predetermined timed relationship.

7. For use in a signal system in which a frequency band may carry any one of a predetermined set of tones of differing frequencies, a tone detector comprising:

a. zero-crossing detector means having an input connected to receive the signal in said frequency band, said zero-crossing detector means providing a train of pulses representing analog excursions of a tone signal across the nominal axis of oscillation of the tone signal, b. period counter means having a reset input and a count stepping input, c. a source of a high speed clock signal drivingly connected to the count stepping input of the period counter means, d. a corresponding set of frequency range decoder gates responsive to predetermined ranges of output count conditions, said set of decoder gates being responsive to said output count conditions of the period counter means as they exist at a time in a predetermined timed relationship to the time when the period counter means reset input is actuated, e. ÷ N pulse frequency divider, the output of said zero-crossing detector means propagated to the reset input of said period counter means through the ÷ N pulse frequency divider, and f. preset means operatively associated with said ÷ N pulse frequency divider, said preset means having an initialize input, said preset means upon receiving a pulse signal at its initialize input being operable to set the state of the ÷ N pulse frequency divider to a frequency divider output condition next preceding that in which a zero-crossing detector means output pulse causes a frequency divider output pulse to be produced.

8. For use in a signal system in which a frequency band may carry any one of a predetermined set of tones of differing frequencies, a tone detector comprising:

a. zero-crossing detector means having an input connected to receive the signal in said frequency band, said zero-crossing detector means providing a train of pulses representing analog excursions of a tone signal across the nominal axis of oscillation of the tone signal, b. period counter means having a reset input and a count stepping input, c. a source of a high speed clock signal drivingly connected to the count stepping input of the period counter means, d. a corresponding set of frequency range decoder gates responsive to predetermined ranges of output count conditions, said set of decoder gates being responsive to said output count conditions of the period counter means as they exist at a time in a predetermined timed relationship to the time when the period counter means reset input is actuated, e. a ÷ N pulse frequency divider, the output of said zero-crossing detector means propagated to the reset input of said period counter means through the ÷ N pulse frequency divider, f. preset means operatively associated with said ÷ N pulse frequency divider, said preset means having an initialize input, said preset means upon receiving a pulse signal at its initialize input being operable to set the state of the ÷ N pulse frequency divider to a frequency divider output condition next preceding that in which a zero-crossing detector means output pulse causes a frequency divider output pulse to be produced, g. means responsive to a predetermined end-of-count (EOC) output condition of the period counter means which is no less than the highest output count condition producible by presence of any of the series of tone codes in the frequency band, said means responsive to a predetermined EOC output condition being operative to inhibit stepping of the next period counter means by clock pulses until after the next successive presence of a pulse at the output of the ÷ N frequency divider, and h. said means responsive to a predetermined EOC output condition being further operative to apply a pulse signal to the initialize input of said preset means.

* * * * *